United States Patent [19]

Rissi

[11] 4,203,465

[45] May 20, 1980

[54] PRECISION PRESSURE CONTROL VALVE

[75] Inventor: Paul Rissi, Grand Rapids, Mich.

[73] Assignee: General Motors Corporation, Detroit, Mich.

[21] Appl. No.: 24,409

[22] Filed: Mar. 27, 1979

[51] Int. Cl.[2] .............................................. F16K 31/12

[52] U.S. Cl. ............................ 137/487.5; 137/505.16; 137/510

[58] Field of Search ................. 137/487.5, 505.16, 510

[56] References Cited

U.S. PATENT DOCUMENTS

| | | | |
|---|---|---|---|
| 1,744,290 | 1/1930 | Weber | 137/505.16 |
| 3,232,091 | 2/1966 | Glassey | 137/487.5 X |
| 3,433,254 | 3/1969 | Frascati | 137/505.16 |

*Primary Examiner*—Harold W. Weakley
*Attorney, Agent, or Firm*—Arthur N. Krein

[57] ABSTRACT

A diaphragm controlled pressure regulator has a control trim fluid pressure applied to the side of the diaphragm opposite to the side thereof in contact with the fluid, the pressure of which is to be regulated, whereby the normal regulator gain value of the regulator is substantially reduced so that the regulated pressure can be maintained substantially constant.

2 Claims, 2 Drawing Figures

PRECISION PRESSURE CONTROL VALVE

FIELD OF THE INVENTION

This invention relates to a pressure regulator and, in particular, to a precision pressure control valve.

BACKGROUND OF THE INVENTION

In a fuel injection system for a spark ignition, internal combustion engine, it is necessary that each fuel injector, such as an electromagnetic fuel injector, used in such an injector system be operative to precisely control the amount of fuel being injected as a function of engine operation. Thus it is important that the pressure of the fuel being supplied to such an intermittently opening injection valve be maintained substantially constant.

It is also important that each such fuel injector be accurately calibrated prior to its installation in the fuel injection system for an engine. This calibration is required to insure that the injector will be operative, as desired, to accurately meter a predetermined quantity of fuel as a function of the opening time of the valve of the injector.

This calibration of each injector can be done by a selective fit approach during assembly of the injector whereby to regulate the injector stroke or, as disclosed in co-pending United States patent application Ser. No. 941,754 entitled "Electromagnetic Fuel Injector" filed Sept. 13, 1978 in the name of James D. Palma and assigned to a common assignee, the structure of the fuel injector is such whereby the injector stroke can be adjusted, as desired, while flowing a calibration fluid on a continuous basis through the injector.

In this latter method of calibration, it is particularly important that the pressure of the calibration fluid flowing through the injector be maintained as constant as possible as by means of a pressure regulator. Otherwise, any variation in the pressure of the calibration fluid will effect the accuracy of calibration of the fuel injector. Thus the performance of a pressure regulator in maintaining a constant predetermined pressure during such calibration of an injector is of particular importance to insure correct initial calibration of the fuel injector.

However, the known prior art pressure regulators are not capable of maintaining the pressure of a fluid within very low pressure tolerance limits for the calibration requirements of a fuel injector, since such known prior art pressure regulators are all subject to regulator "gain". Regulator "gain" is defined as the regulator pressure change per unit fluid flow change through the regulator assembly. In the use of such a pressure regulator to control the pressure of a calibration fluid during calibration of a fuel injector, it will be apparent that the desired regulator gain values for such a pressure regulator should be as low as possible, preferably zero.

Accordingly, a primary object of the present invention is to provide an improved, diaphragm controlled, pressure regulator that is adapted to accurately control the pressure of fluid flowing to a fuel injector, independent of the amount of fluid flowing through the pressure regulator.

Another object of the invention is to provide an improved, diaphragm controlled, pressure regulator whereby a trim control pressure can be applied to the side of the diaphragm opposite the pressure regulated side of the diaphragm whereby the mean pressure of the regulated fluid can be accurately maintained.

A further object of the present invention is to provide an improved, diaphragm controlled, pressure regulator that is operative in a manner whereby the controlled pressure can be accurately maintained without substantial regulator gain irrespective of the rate of fluid flow through the pressure regulator.

Still another object of the present invention is to provide an improved, diaphragm controlled, pressure regulator wherein a variable height standpipe is used to provide a control trim pressure to one side of the diaphragm so that the normal gain of such a pressure regulator is reduced to substantially zero.

For a better understanding of the invention as well as other objects and further features thereof, reference is had to the following detailed description of the invention to be read in connection with the accompanying drawings.

DESCRIPTION OF THE PREFERRED EMBODIMENTS

Figure 1:
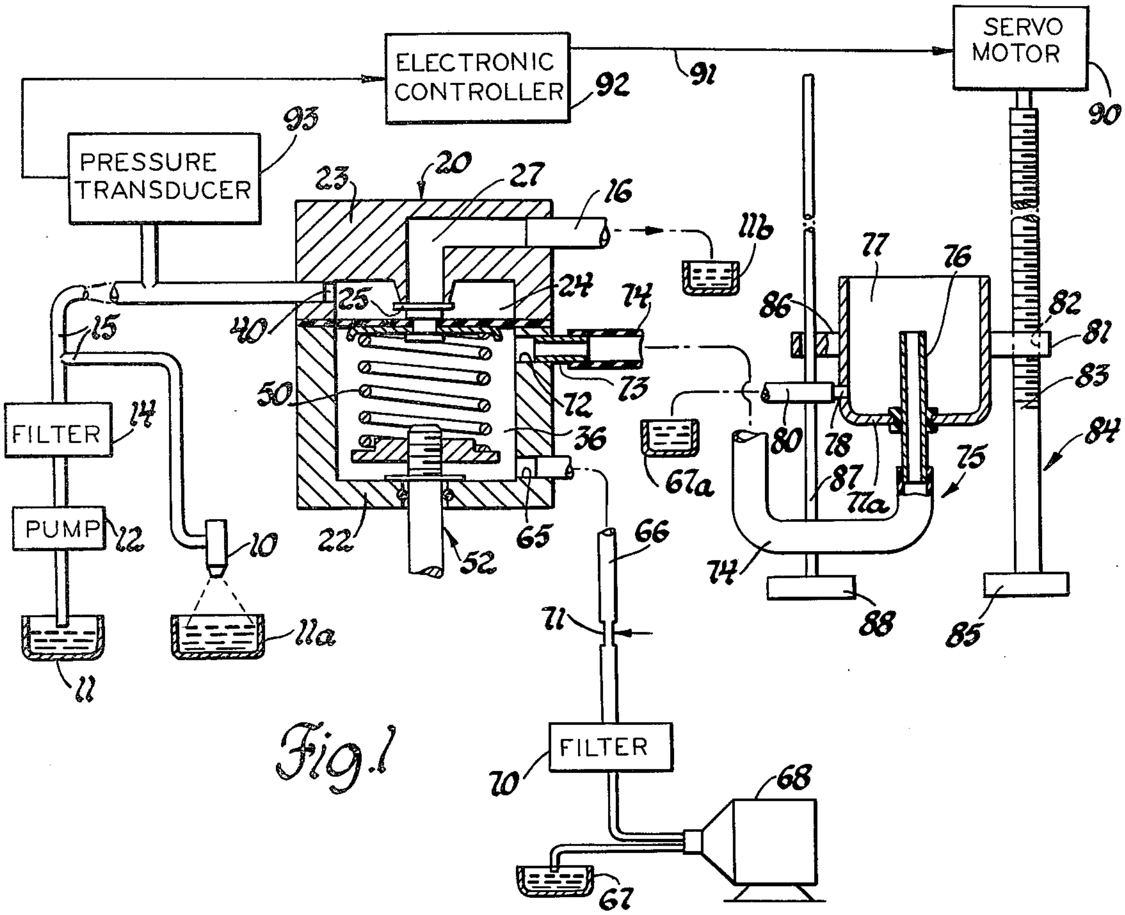
FIG. 1—is a schematic elevational view of a portion of a calibration flow stand having a precision pressure control valve in accordance with the invention incorporated therein, with the pressure regulator, per se, thereof shown in longitudinal cross section; and, FIG. 2—is an enlarged longitudinal, cross-sectional view of the pressure regulator, per se, of FIG. 1.
Figure 2:
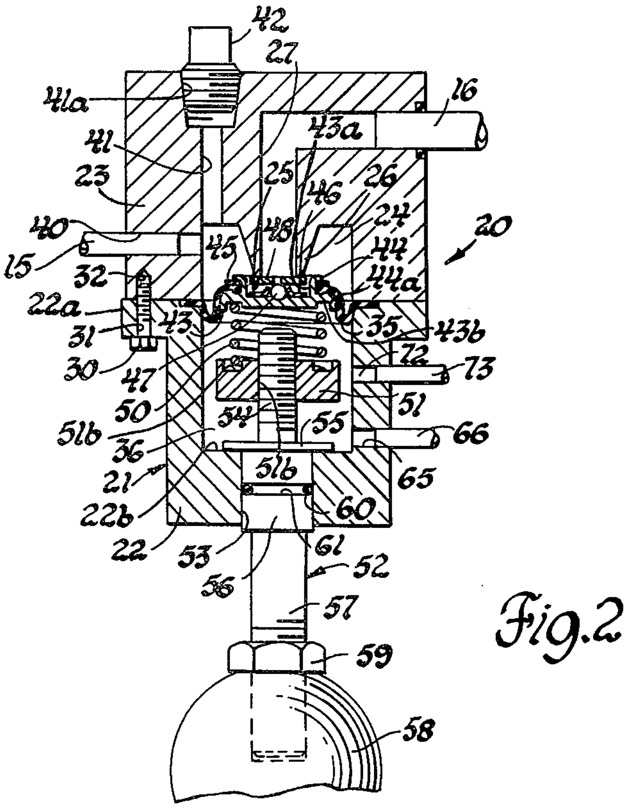

Referring first to FIG. 1, there is shown a portion of a calibration flow stand used for flowing a calibration fluid on a continuous basis through a calibration fluid flow air circuit. A fuel injector 10 is adapted to be placed in the flow path through this flow circuit to receive the pressure regulated fluid so that an operator can adjust the injector stroke of the injector, as desired, to provide for a predetermined injection flow rate therefrom per unit of time.

For this purpose, a suitable calibration fluid, such as Stoddard solvent, stored in a reservoir tank 11 is continuously conveyed by a low pressure pump 12 through a filter 14 and a supply conduit 15 to the injector 10. Fuel is discharged from the injector 10 into a suitable reservoir 11*a* for return in a suitable manner to the reservoir 11.

To maintain the pressure of the calibration fluid supplied to the injector 10 at a constant predetermined pressure, of for example 10 psi, a pressure regulator generally designated 20, has the inlet thereof connected to the supply conduit 15 at a suitable location closely adjacent to the upstream side of the fuel injector 10. The pressure regulator 20 is of a type wherein a diaphragm controls movement of a closure member relative to an outlet of the pressure regulator. Fluid discharged from the pressure regulator flows therefrom via a conduit 16 to a reservoir 11*b*, which like the reservoir 11*a* can be operatively connected to the reservoir 11 for the return of calibration fluid thereto.

Referring now to the pressure regulator 20, this pressure regulator in the construction shown, includes a two-piece cylindrical housing 21 provided by a cup-shaped lower portion 22 and an inverted cup-shaped upper portion 23. The upper portion 23 provides a compartment, hereinafter referred to as pressure chamber 24 having an axially aligned, depending valve seat 25 therein, as provided by a cylindrical boss 26 formed integral with the upper portion and provided with at least the lower portion of a discharge passage 27 extending therethrough. One end of the passage 27 is encircled by the valve seat 25 while the opposite end of the passage 27 is adapted to have one end of the discharge conduit 16 secured thereto.

The upper member 23 and the lower member 22 are suitably secured together as by screws 30 that extend through apertures 31 in the radial flange 22*a* at the upper end of the lower member 22, these screws being threadedly received in the internally threaded apertures 32 that extend upward from the lower surface of the upper member 23. A flexible diaphragm 35 is suitably sandwiched at its outer peripheral edges between the mating surfaces of the upper and lower members 23 and 22, respectively. The diaphragm 35 forms with the lower member 22 a control chamber 36 and separates this control chamber 36 from the pressure chamber 24.

The upper member 23 is also provided with a side inlet port 40 that has one end thereof opening into the pressure chamber 24 while its opposite end is adapted to be secured to a downstream end of the supply conduit 15. In the construction illustrated, the upper member 23 is also provided with a vertical bleed passage 41 to permit the bleed of air from the pressure chamber. Bleed passage is adapted to be normally closed by means of an externally threaded plug 42 that is threaded into the internally threaded upper end 41*a* of the bleed passage 41.

The diaphragm 35 is adapted to carry a suitable closure member. In the construction shown, an annular diaphragm retainer disc 43 has a portion thereof extending up through a central aperture in the diaphragm 35 and this retainer disc 43 is clamped to the diaphragm as by having the circumferential portion of the diaphragm 35 adjacent to the central aperture sandwiched between adjacent opposed flanges 44 and 44*a* of the retainer disc with a bearing washer 45 positioned between flange 44 and the diaphragm. The retainer disc 43 is provided with a central depending bore 43*a* of a size to receive a ball retainer disc 46. The valve or closure member is in the form of a flat valve disc 48 with a ball 47 rigidly secured thereto in a suitable manner, as by solder. As shown, the ball retainer disc 46 is provided with a central aperture and the material of this disc 46 surrounding the aperture is suitably upturned so as to provide a frusto conical ball retainer socket for the ball 47. The closure member 48 is thus loosely positioned so as to effect sealing mating engagement with the valve seat 25.

A coil spring 50, of predetermined force, as desired, is positioned within the control chamber 36 to have one end thereof abut against the lower surface of the diaphragm retainer disc 43. The opposite end of the coil spring 50 abuts against a spring retainer disc 51. Both the disc 43 and the spring retainer disc 51 are provided with suitable means, such as recessed circular grooves 43*b* and 51*a*, respectively, for centering the spring 50. Spring retainer disc 51 is provided with an internally threaded central aperture 51*b* therethrough for threaded engagement onto a spring bias adjusting screw 52 that extends through a suitable thru bore aperture 53 in the lower member 22 into the control chamber 36. The spring retainer disc 51 can thus be adjustably positioned axially, as desired, within the control chamber 36 whereby to regulate the spring rate of coil spring 50 in a known manner.

In the construction shown, the adjusting screw 52 includes a reduced diameter, externally threaded upper portion 54 that is adjustably threadedly received in the spring retainer disc 51, an upper intermediate enlarged flange 55, an intermediate cylindrical sealing land portion 56, and a lower stem portion 57 having an adjustment knob 58 operatively secured thereto. In the construction illustrated, knob 58 is threaded onto the lower externally threaded end of the lower stem portion 57 and is retained against rotation thereon as by a locknut 59. The central land portion 56 of the adjusting screw 52 is of a diameter formed complimentary to the internal diameter of aperture 53 and is provided with a recessed annular groove 61 in the outer peripheral surface thereof to receive an O-ring seal 60. The O-ring seal 60 is operative to effect a fluid seal between the exterior peripheral surface of screw 52 and the interior cylindrical wall surface of the lower member 22 defining the aperture 53, while still permitting rotation of the adjusting screw 52.

Flange 55 is of a suitable diameter greater than the outside diameter of the intermediate land 56 and therefore greater than the inside diameter of the aperture 53 whereby this flange can serve as a stop member to limit axial movement of the adjusting screw 52 in one direction, a downward direction with reference to the Figures. The coil spring 50 is thus operative to normally bias the diaphragm 35 and therefore the closure member 48 associated therewith toward seating engagement against the valve seat 25 and to bias the adjusting screw 52 in an axial direction whereby the flange 55 will abut against the inner wall 22*b* in the base of the lower member 22.

The pressure regulator assembly thus far described is of substantially conventional construction and, as is well known, the area of the diaphragm 35 exposed to the pressure of fluid in the pressure chamber 24 is substantially greater than the cross sectional flow area of the valve seat encircling the flow passage 27.

Also as is well known in the pressure regulator art, the regulator gain value for a given valve/seat design is a function of the combined effective spring rate of the diaphragm 35 and of the helical coil compression spring 50 which provides an upward biasing force on the diaphragm 35 to effect seating of the valve or closure member 48 against the valve seat 25.

Thus in operation of the thus far described pressure regulator, as the pressure of fluid in the pressure chamber 24 exceeds the desired control pressure, the pressure differential across the diaphragm 35 will cause movement thereof in a direction to effect unseating of the closure member 48 relative to the valve seat 25. As this occurs, a flow orifice of limited effective cross sectional area will be established to permit the discharge of fluid from the pressure chamber 24 out through the discharge passage 27 to thereby permit the pressure of fuel in the pressure chamber 24 to decrease accordingly. In operation, the pressure regulator is operative to maintain a set pressure under subtle flow changes, with the diaphragm 35 positioning itself and therefore positioning the closure member 48 in such a manner so as to keep the regulated pressure of fuel in the pressure chamber 24 relatively constant.

However, as is well known, as the volume of fluid flowing through the pressure regulator increases, further unseating of the closure member relative to valve seat is required to permit for this increased fluid flow from the pressure chamber 24 whereby to regulate the pressure of fluid in the pressure chamber. However, as the diaphragm 35 and spring 50 are moved downward to accommodate this additional opening movement of the closure member 48 relative to the valve seat 25, the effective combined spring rate of the diaphragm 35 and coil spring 50 will increase thus requiring an increase in the pressure of the fluid in the pressure chamber 24 to effect this additional movement of diaphragm 35 and coil spring 50 in a direction to permit for this increased flow of fluid out through the passage 27. This increase of fluid pressure in the pressure chamber 24 is the regulator gain referred to and described hereinabove and it varies as a function of fluid flow through the regulator.

Now in accordance with the invention, means are provided for operative association with the pressure regulator 20 whereby a control trim pressure can be applied to the opposite side of the diaphragm 35 from that acted upon by the fluid in the pressure chamber 34 whereby regulator gain can be substantially eliminated.

For this purpose, the lower member 22 is provided with an inlet passage 65 that opens at one end into the control chamber 36 and which is adapted to be connected at its other end, as by a delivery conduit 66, to a source of a suitable trim fluid, as desired. As shown, the trim fluid, as from a suitable fluid reservoir 67, is continuously delivered by means of a low pressure pump 68, through a filter 70 and a variable sized orifice flow restriction 71 provided in the flow path through the delivery conduit 66, to the control chamber 36.

Lower member 22 is also provided with an outlet passage 72 that opens at one end from the control chamber 36. The outlet passage 72 at its other end is connected by a fitting 73 to one end of the flexible conduit 74 of a variable height standpipe 75. The flexible conduit 74 of standpipe 75 at its opposite or upper end is connected to a fitting 76 that is secured so as to extend through the base **77*a* of an overflow cup 77 with the open upper end of the fitting 76** positioned in the overflow cup so that trim fluid overflowing therefrom will be caught in the overflow cup.

The upper end of the standpipe 75 is thus suitably fixed to the overflow cup 77 for movement therewith. The overflow cup 77 is provided with a drain fitting 78 at its lower end that is connected by a flexible conduit 80 to effect discharge of trim fluid into a reservoir **67*a*. To permit for vertical up and down movement of the overflow cup 77 and therefore of the upper end of standpipe 75, the overflow cup 77, in the construction shown, is provided with a radially outwardly extending support flange 81 having an internally threaded, vertical aperture 82 therethrough. The threaded aperture 82 is suitably sized so as to be threadedly engaged by the lead screw 83 of a vertically extending screw jack, generally designated 84. In the construction shown, the lead screw 83 is rotatably supported in a screw jack base 85 that is suitably fixed relative to the pressure regulator 20 preferably at a predetermined location below the diaphragm 35 of the regulator. The threads of the lead screw 83 and of the threaded aperture 82 have a predetermined fine pitch, as desired, to provide a small lead or movement of the spill cup and therefore of the upper end of the standpipe 75 per revolution of the lead screw. With this arrangement, by rotation of the lead screw 83 the height of the overflow cup 77 and therefore the effective height of the standpipe 75 relative to a fixed base line, such as the underside of the diaphragm 35, can be varied so as to regulate the pressure of the fluid in the control chamber 36**.

Suitable means are also provided to prevent the cup 77 from rotating with the lead screw 83 as, for example, by the provision of a vertical guide bar 87 fixed to a base 88 in position to be received by the radial outward extending, notched guide flange 86 of the overflow cup 77.

The lead screw 83 is rotatably driven, in the construction shown, means of a conventional electrical servo motor 90. The servo motor 90 is connected by electrical circuit wires 91 to a suitable electronic control circuit 92 whereby the servo motor can be energized, as desired, in a known manner, to effect rotation of the lead screw 83 either clockwise or counterclockwise. A pressure transducer 93 is operatively positioned to sense the pressure of the fluid in the pressure chamber 24 so as to provide a control signal representing a pressure change of the calibration fluid to the electronic control circuit 92. For example, the pressure transducer, in the construction shown, is operatively connected to the supply conduit 15 at a location intermediate the injector 10 and the pressure regulator 20 to, in effect, sense the pressure of the fluid in pressure chamber 24.

The electronic control circuit 92 is operative to provide an electrical signal to energize the servo motor 90 so as to effect rotation of the jack screw 83 either clockwise or counterclockwise to lower or raise the overflow cup as necessary, to vary the trim pressure of fluid in control chamber 36.

In operation, the adjusting screw 52 is set to control the bias of spring 50 so as to set the low pressure limit of the pressure regulator 20 for the desired fluid pressure, for example, 10 psi, to be held in the pressure chamber 24. This is done with the overflow cup 77, and therefore the standpipe 75 located initially in a lowered position relative to the plane of the diaphragm 35. As thus set up, by raising the overflow cup 77 and therefore the upper end of the standpipe 75, the controlled pressure of the fluid in the pressure chamber 24 can be increased to its desired mean value. If the pressure of the fluid in the control chamber 24 should subsequently change due to flow rate changes in the injector calibration fluid flow test circuit, this change in pressure will be sensed by the pressure transducer 93 so as to provide an appropriate control signal, in a known manner, to the electronic control circuit 92. The electronic control circuit 92 is then operative to provide an electrical signal to actuate the servo motor 90 so as to raise or lower the overflow cup 77 automatically to re-establish the mean control pressure of the fluid in the pressure chamber 24 by increasing or decreasing the pressure, as required, of the trim fluid in the control chamber 36.

In this manner the pressure of the trim fluid within the control chamber 32 can be controlled very accurately. Because of the preferred fine pitch of the lead screw 83, a relatively large number of turns of the lead screw will move the overflow cup a corresponding relatively short distance, dependent upon the lead of the screw, to effect a change in the pressure of the trim fluid in the control chamber in corresponding very small increments.

This arrangement thus provides significant greater adjustment resolution of the forces acting on the control chamber 36 side of the diaphragm 35 than can possibly be obtained by adjusting the relatively course adjustment screw 52 and, of course, in the embodiment shown, this can be done automatically.

However, although as shown and described, this fine adjustment of the trim force acting on the underside of the diaphragm 35 can be done automatically, as by the electrical servo motor and control circuit shown and described, it should be realized that this adjustment of the trim pressure can also be done manually.

For example, in a particular application, a conventional pressure gage, not shown, was substituted for the pressure transducer 93 to sense the effective pressure of the fluid in pressure chamber 24. Dependent upon the pressure reading from the pressure gage, the lead screw 83 was rotated manually by an operator to raise or lower the spill cup 77, as required, by visual observation of the pressure as shown by the pressure gage, whereby the trim pressure in the control chamber 36 was adjusted manually. In this manually controlled application, the desired control pressure of the fluid in the pressure chamber 24 was to be held at a mean value of 10 psi. In actual operation, this pressure was maintained by manual turning of the lead screw 83 so as to maintain a mean pressure of 10+ or −0.003 psi.

In the above-described application, the fluid used both in the calibration of the injector 10 and as the trim fluid was a Stoddard solvent, it will be apparent that any suitable fluid can be used as the trim fluid. For this application using the same fluid on opposite sides of the diaphragm, the length of the lead screw was approximately 24 in. so as to permit substantial variation of the trim control pressure. When using the same fluid as both the controlled calibration fluid and as the trim fluid, it will be apparent that the reservoirs 11, **11*a*, 11*b*, 67, and 67*a* can be combined as a single large main reservoir for this fluid, instead of being in the form of plural reservoirs, as shown in the embodiment illustrated in FIG. 1. Of course, when the trim fluid used is different from that used as the controlled calibration fluid, mixing of the fluids should be avoided. Thus, in this latter application, reservoirs 11, 11*a* and 11*b* can be combined as one reservoir and reservoirs 67 and 67*a*** can then be combined as an independent second reservoir for the trim fluid.

The embodiments of the invention in which an exclusive property or privilege is claimed are defined as follows:

1. In a diaphragm controlled pressure regulator of the type wherein the diaphragm defines with the regulator housing a pressure chamber on one side of the diaphragm and a control chamber on its opposite side, the diaphragm having a closure member associated therewith for cooperating with a valve seat encircling a discharge passage to control fluid discharge from the pressure chamber out through the discharge passage; the improvement comprising an inlet passage in the regulator housing opening at one end into the control chamber and being connectable at its opposite end to a source of fluid; an outlet passage in the regulator housing from the control chamber; a variable height standpipe connected at one end to the opposite end of said outlet passage and having an overflow for fluid at its opposite end; and, a controlled actuator means operatively connected to said standpipe for regulating the effective height thereof as a function of the pressure of fluid in the pressure chamber whereby a regulated control trim fluid pressure can be maintained in the control chamber to control movement of the diaphragm and of the closure member associated therewith relative to the valve seat so as to maintain the pressure of fluid within the pressure chamber substantially constant.

2. In a pressure regulator of the type including a housing having an upper portion and a lower portion secured together with a diaphragm valve means sandwiched therebetween, the diaphragm valve means defining with the upper portion a pressure chamber on one side of the diaphragm valve means and with the lower portion a control chamber on its opposite side, the upper portion having a fluid inlet opening into thepressure chamber that is connectable to a source of fluid under pressure and a depending boss extending into the pressure chamber, the boss having a fluid outlet therethrough with the free end of the boss defining a valve seat that encircles the fluid outlet and is positioned so as to be engageable by the diaphragm valve means for the control of fluid flow from the pressure chamber out through the fluid outlet, and an adjustable spring means operatively associated with the diaphragm valve means to normally bias the diaphragm valve means toward seating engagement with the valve seat; the improvement comprising an inlet passage in the lower portion that is connectable at one end to a source of fluid and that has its other end opening into the control chamber; an outlet passage in the lower portion having one end in communication with the control chamber; a variable height standpipe connected at one end to the opposite end of the outlet passage and having an overflow for fluid at its opposite end; and, a control means operatively connected to said standpipe for regulating the effective height thereof relative to the control chamber as a function of the pressure of fluid in the pressure chamber whereby a control trim fluid pressure can be maintained in the control chamber.

* * * * *